Aug. 9, 1932.  E. E. ARNOLD  1,870,475
PIPE WELDING MACHINE
Filed Dec. 27, 1930
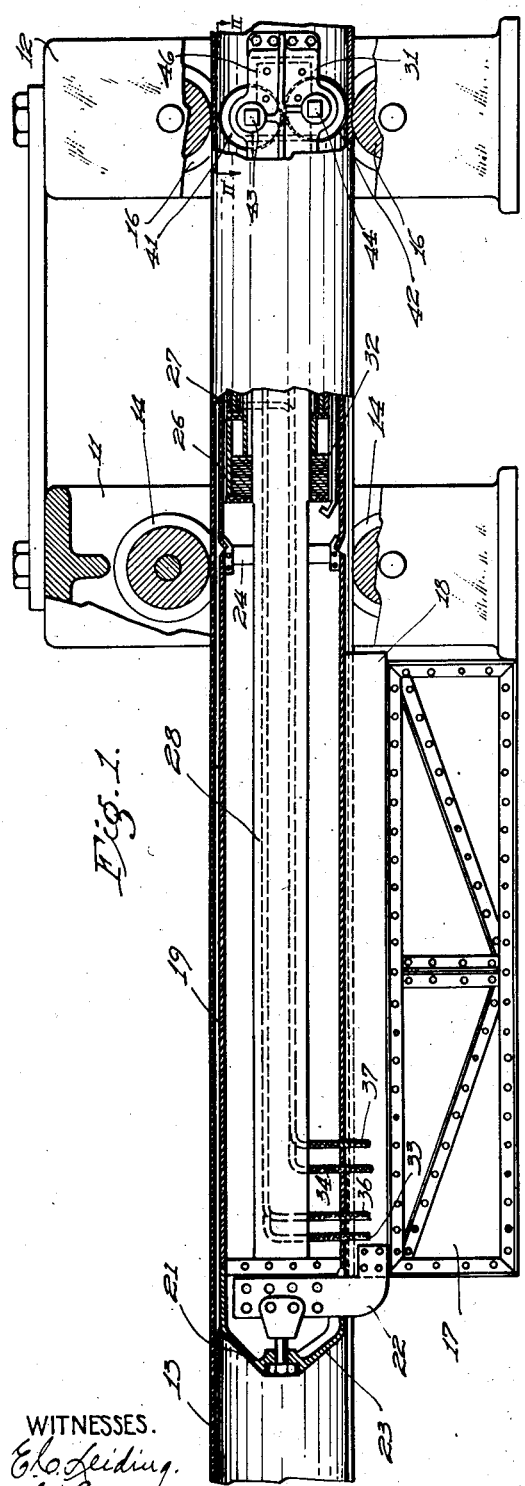
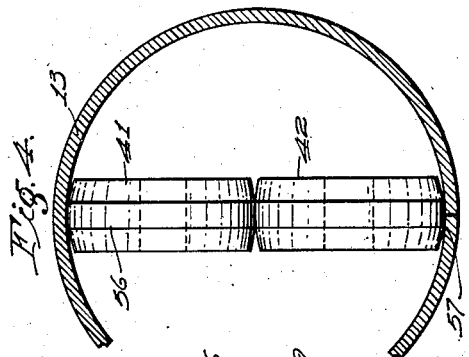
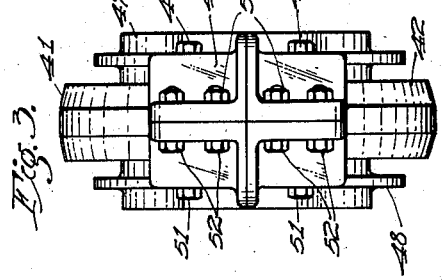
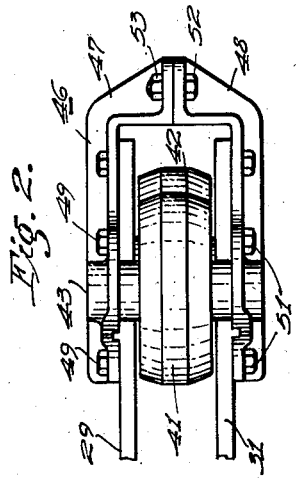
WITNESSES.
INVENTOR
Edwin E. Arnold.
BY
ATTORNEY Patented Aug. 9, 1932

1,870,475

UNITED STATES PATENT OFFICE

EDWIN E. ARNOLD, OF PITTSBURGH, PENNSYLVANIA, ASSIGNOR TO WESTINGHOUSE ELECTRIC & MANUFACTURING COMPANY, A CORPORATION OF PENNSYLVANIA

PIPE WELDING MACHINE

Application filed December 27, 1930. Serial No. 505,065.

My invention relates to electric welding and particularly to devices for welding initially open, moving pipe blanks.

An object of my invention is to provide means in a pipe-welding machine that shall reduce or eliminate torsional stresses during the welding operation.

My invention is particularly applicable to inductive welding machines employing an energizing coil for inductively heating an initially open pipe blank moving through the machine, pinch rolls for guiding and effecting a welding pressure on the moving pipe blank, and a pair of cooperating pressure rolls cooperating with the pinch rolls to effect a welding seam, and it relates to the special form or shape of the peripheries of the pressure rolls, which are each provided with an axially-central flat peripheral portion to preclude the formation of torsional stresses between the moving pipe blank and the pressure rolls.

In the single sheet of drawing,

Figure 1 is a view mainly in vertical longitudinal section, with portions in side elevation, of an inductive welding machine, including the device embodying my invention, Fig. 2 is a top plan view on an enlarged scale of the pressure rolls and their support, taken along the line II—II of Fig. 1, Fig. 3 is a view, in end elevation, of the parts shown in Figure 2, and, Fig. 4 is a view, in end elevation, on an enlarged scale, of a pipe and the pressure rolls.

Referring particularly to Fig. 1 of the drawing, I have shown, generally only, a leading standard 11 and a trailing standard 12, the terms "leading" and "trailing" being used with reference to the direction of movement of a pipe blank 13, which is moved from left to right in the device in the plane of the drawing.

The standard 11 is provided with a plurality of guide rolls 14, only two being shown, which are suitably mounted for rotative movement therein. The arcuate surfaces of the respective rolls 14 are in accordance with the diameter of the pipe blank being welded and any suitable or desired number of these rolls may be employed.

The trailing standard 12 is provided with a plurality of pinch rolls 16, at least two of which are located diametrically opposite, and I employ, preferably, four or six such rolls, each of which is mounted for rotative movement in standard 12, the peripheral surface of each of the rolls being grooved in accordance with the diameter of a pipe blank 13 to be welded.

The guide rolls 14 and the pinch rolls 16 may be actuated, by any suitable means, to move the pipe blank and, if necessary, additional guide or pinch rolls (not shown in the drawing) may be provided.

Means for supporting the pipe blank 13 during its longitudinal movement through the welding machine may be constituted by a structure 17, made of fabricated steel members, and a relatively thin metal plate 18 supported at the top of the member 17, and supporting, in turn, a tubular member 19 which is slightly smaller, in external diameter, than the internal diameter of the pipe to be welded. I may provide a leading head 21 at the end of the tubular member 19, which may be built up in any suitable or desired manner and may include a reenforcing member 22, of substantially L-shape, and a conical head, shown at 23, which may be termed a "torpedo head". This device constitutes no part of my present invention but is shown for the sake of completeness of illustraton.

At the trailing end of tubular member 19, I provide a split metal ring 24, which is secured to member 19 and, in turn, supports a second tubular member 26, coaxial with member 19 and extending between the sets of guide and pinch rolls hereinbefore described. The leading end of the tubular member 26 is secured to the ring 24 by suitable bolts, or in any other manner, this construction being made necessary in order to permit of easy assembly and disassembly of the tube or conduit members.

An energizing coil 27 is located within tubular member 26, a part only thereof being shown as supported by an internal structure 28, including, more particularly, two spaced parallel-extending plates 29 and 31, the ends of which are shown in top plan view in Fig.

2 of the drawing. A laminated core structure 32 is provided, only a portion of which is shown in Fig. 1 of the drawing, the core member being likewise supported by the box-like structure 28, including the plates 29 and 31.

The energizing winding 27 is adapted to be traversed by an alternating current of suitable frequency and may be divided into a plurality of parallel-connected sections, the terminals of which are brought to the leading end of conduit 19 and then extend downwardly, as terminal leads 33, 34, 36 and 37, respectively, to permit of connection to a source of supply of electric energy.

A pair of mutually cooperating pressure rolls 41 and 42 are located at the trailing end of plates 29 and 31 and are rotatably supported on shafts 43 and 44, respectively, the ends of each of these shafts being of square section and supported in a member 46 of U-shape which is built up of two members 47 and 48, each of substantially L-shape. The longer legs of members 47 and 48 extend parallel to, and on the outside of, plates 29 and 31 to which they may be fastened by means of bolts 49 and 51. The shorter legs of members 47 and 48 may be held together by bolts 52 and nuts 53.

The location of pressure rolls 41 and 42 is such as to cooperate with the pinch rolls 16, located diametrically opposite to each other, and the diameters of the pressure rolls 41 and 42 are such that they engage each other at substantially the axis of the pipe blank and of tubular members 19 and 26 and they also engage the inner surface of the pipe being welded.

It has been found that, if the peripheral surfaces of rolls 41 and 42 are curved to the exact internal radius of the pipe to be welded, torsion is produced during the longitudinal movement of the pipe through the welding machine. It is believed that such torsion is caused by the slight inaccuracies in the alinement of the pressure rolls caused either by necessary clearances for rotating motion or by wear resulting from use, as well as inaccuracies in the internal surface of the pipe. Such inaccuracies would tend to start one pressure roll tracking a path on the cooperating pressure roll out of true plane alinement, and this lateral tracking would tend to progress so that a tendency for the trailing end, supporting the pressure rolls, to roll or move spirally through the pipe would result, and, if this lateral twisting were permitted to continue, injury to the head supporting the pressure rolls might result. Any variation in thickness between the joined edges of the plate at the welded seam would also tend to introduce a lateral gripping or twisting action between the rolls themselves and the rolls and the pipe.

As may be noted by reference to Figs. 2 and 3 of the drawing, the outer surfaces of the rolls 41 and 42 are not the same as the inner peripheral surface of the pipe blank.

Each pressure roll 41 and 42 has a flat central peripheral portion on its outer surface, the side portions being of arcuate shape in lateral section, the radius of curvature of each of the side portions being slightly less than the radius of the inner periphery of the welded pipe. The center of each of the arcuate side surfaces is in the central plane of the rolls, so that a gradually increasing clearance is provided between the side portions and the inner surfaces of the pipe, beginning with zero clearance or even less at the planes marked 56 in (Fig. 4) and reaching a maximum at each outer edge of the rolls.

The amount of the pressure between the rolls and the inside of the pipe at the points indicated in 56 depends, of course, upon the relative dimensions of the rolls and the pipe, and, if the dimension over the two pressure rolls is substantially greater than the corresponding inner dimension of the pipe, the latter may be slightly deformed when in actual engagement with the pressure rolls.

It will be seen that the pipe is engaged, at its inner periphery, at two spaced relatively narrow "bands" by the pressure rolls and also that the flat central portion on one of the rolls will result in a radially thickened weld, as shown at 57 in Fig. 4 of the drawing, and both of these features will aid in maintaining the pressure rolls in true plane alinement and in preventing a torsional or lateral twisting effect.

The two spaced portions on each pressure roll intimately operatively engaging the pipe will cooperate with each other and with the pipe to maintain the planar alinement of the two pressure rolls and to prevent excessive twisting movement of the pipe should such movement start because of one of the causes hereinbefore mentioned. The corrective effect of the two spaced portions of the pressure rolls may be likened to the operation of a belt on a crowned pulley; that is, any torsion or twisting caused by one side surface of the pressure rolls will be resisted by the other side surface, with a resultant tendency to run in the same plane and to track properly. The thickned seam will also aid in producing this result.

While I have hereinbefore set forth my ideas as to the operation of a welding machine, including pressure rolls of the particular form embodying my invention, I do not desire to be limited thereto, it being my intention to avoid undue emphasis upon an element which may be of lesser importance.

Since various modifications may be made in the device embodying my invention without departing from the spirit and scope thereof, I desire that only such limitations shall be placed upon the invention as are set forth in the appended claims or are imposed by the prior art.

I claim as my invention:

1. In a pipe-welding machine including a standard, pinch rolls thereon for engaging an initially open pipe blank moving therethrough, and means for heating said pipe blank, a pair of pressure rolls inside of the pipe blank to cooperate with said pinch rolls to guide the pipe blank and effect welding thereof, the periphery of each of said pressure rolls being so shaped as to prevent the development of torsional force between the moving pipe and the pressure rolls.

2. In a welding machine for welding initially open pipe blanks moving through said machine and including a standard, pinch rolls on said standard for engaging a pipe blank, means for heating the same, and a support for said heating means, a pair of pressure rolls on said heating-means-support cooperating with said pinch rolls to guide the pipe blank and effect the welding thereof, the peripheries of said pressure rolls being so shaped as to ensure longitudinal tracking of the pressure rolls relatively to said pipe free from twisting components of movement.

3. In a machine for welding initially open substantially cylindrical pipe blanks moving through said machine and including a plurality of peripherally spaced pinch rolls for engaging one surface of a moving pipe blank, and means for heating said pipe blank, a pair of pressure rolls cooperating with each other and with certain of the pinch rolls to weld said initially open pipe blank, said pressure rolls having partially flattened circumferential surfaces for ensuring straight longitudinal movement of the pipe blank relatively to the pressure rolls.

4. In a machine for welding initially open substantially cylindrical pipe blanks moving through said machine and including a plurality of peripherally spaced pinch rolls for engaging one surface of a moving pipe blank, and means for heating said pipe blank, a pair of pressure rolls cooperating with each other and with certain of the pinch rolls to weld said initially open pipe blank each roll having a periphery which has a flattened portion intermediate its edges to provide a seam that is thicker radially than the metal of such blank, which thickened seam cooperates with one of the rolls to ensure coplanar alinement of the rolls with each other.

5. In a machine for welding initially open substantially cylindrical pipe blanks moving through said machine and including a plurality of peripherally spaced pinch rolls for engaging one surface of a moving pipe blank, and means for heating said pipe blank, a pair of pressure rolls having partially flattened peripheral surfaces cooperating with each other and with certain of the pinch rolls to weld said initially open pipe blank with a seam that is thicker radially than the metal of the said blank to provide a non-cylindrical peripheral portion in the pipe cooperating with the pressure rolls to effect straight-line longitudinal tracking of the pressure rolls relative to the pipe free from twisting components of movement.

In testimony whereof, I have hereunto subscribed my name this 23rd day of December, 1930.

EDWIN E. ARNOLD.